US012750808B2

(12) United States Patent
Chen et al.

(10) Patent No.: US 12,750,808 B2
(45) Date of Patent: Sep. 29, 2026

(54) METHOD AND APPARATUS OF PROCESSING POSITIONING INFORMATION, ELECTRONIC DEVICE, AND STORAGE MEDIUM

(71) Applicants: Nuctech Company Limited, Beijing (CN); Tsinghua University, Beijing (CN)

(72) Inventors: Zhiqiang Chen, Beijing (CN); Li Zhang, Beijing (CN); Yunda Sun, Beijing (CN); Le Shen, Beijing (CN); Zhipeng PI, Beijing (CN); Shuo Wang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 18/573,744

(22) PCT Filed: Jul. 19, 2023

(86) PCT No.: PCT/CN2023/108103
§ 371 (c)(1),
(2) Date: Dec. 22, 2023

(87) PCT Pub. No.: WO2024/032336
PCT Pub. Date: Feb. 15, 2024

(65) Prior Publication Data

US 2025/0234323 A1 Jul. 17, 2025

(30) Foreign Application Priority Data

Aug. 8, 2022 (CN) ......................... 202210946519.3

(51) Int. Cl.
*H04W 64/00* (2009.01)
*G06T 7/70* (2017.01)

(52) U.S. Cl.
CPC ............... *H04W 64/00* (2013.01); *G06T 7/70* (2017.01); *G06T 2207/10081* (2013.01)

(58) Field of Classification Search
None
See application file for complete search history.

(56) References Cited

U.S. PATENT DOCUMENTS 10,939,406 B1 3/2021 Wu
2002/0167444 A1* 11/2002 Lee ....................... H04W 64/00 342/387

(Continued)

FOREIGN PATENT DOCUMENTS

CN 106937297 A 7/2017
CN 206851040 U 1/2018

(Continued)

OTHER PUBLICATIONS

"International Application Serial No. PCT/CN2023/108103, International Search Report dated Oct. 19, 2023", (Oct. 19, 2023), 3 pgs.

(Continued)

*Primary Examiner* — Tsung Yin Tsai
(74) *Attorney, Agent, or Firm* — Schwegman Lundberg & Woessner, P.A.

(57) ABSTRACT

The present disclosure provides a method and an apparatus of processing a positioning information, an electronic device, and a storage medium, which may be applied to a field of a positioning technology. The method includes: acquiring, in response to a positioning request, a distance information of each of a plurality of base stations for a terminal device; determining, based on a plurality of distance information, a first position information of the terminal device in a first reference system determined based on the plurality of base stations; and determining a positioning information of the terminal device for a target object based on the first position information and a position information (Continued)

of the target object, where the position information of the target object is determined from a tomography result.

14 Claims, 5 Drawing Sheets

(56) References Cited

U.S. PATENT DOCUMENTS

| | | | | |
|---|---|---|---|---|
| 2004/0177143 | A1* | 9/2004 | Maciel | H04L 43/00 709/224 |
| 2004/0198386 | A1* | 10/2004 | Dupray | G01S 5/02 455/456.1 |
| 2005/0249175 | A1* | 11/2005 | Nasu | H04L 67/06 370/235 |
| 2005/0249416 | A1* | 11/2005 | Leue | G06T 7/11 382/131 |
| 2009/0149191 | A1* | 6/2009 | Luers | H04W 64/00 455/456.1 |
| 2010/0085904 | A1* | 4/2010 | Hamaue | H04W 52/283 370/311 |
| 2010/0178928 | A1* | 7/2010 | O'Reilly | H04W 4/029 455/452.2 |
| 2010/0277339 | A1* | 11/2010 | Cyganski | G01S 1/026 340/8.1 |
| 2012/0122484 | A1* | 5/2012 | Marchenko | G01S 5/14 455/456.1 |
| 2013/0090129 | A1* | 4/2013 | Turner | H04N 21/2541 455/456.1 |
| 2013/0310074 | A1* | 11/2013 | Porzio | G01S 11/02 455/456.1 |
| 2014/0243013 | A1* | 8/2014 | Liu | G01S 5/0278 455/456.1 |
| 2019/0297628 | A1* | 9/2019 | Kato | H04W 72/0453 |
| 2021/0219104 | A1* | 7/2021 | Chen | H04L 5/0048 |
| 2021/0400436 | A1* | 12/2021 | Lev | H04W 4/029 |
| 2022/0110049 | A1* | 4/2022 | Wang | H04W 48/16 |

FOREIGN PATENT DOCUMENTS

| | | |
|---|---|---|
| CN | 113382473 A | 9/2021 |
| CN | 114040322 A | 2/2022 |
| CN | 114630262 A | 6/2022 |

OTHER PUBLICATIONS

"International Application Serial No. PCT/CN2023/108103, Written Opinion dated Oct. 19, 2023", (Oct. 19, 2023), 3 pgs.

* cited by examiner

METHOD AND APPARATUS OF PROCESSING POSITIONING INFORMATION, ELECTRONIC DEVICE, AND STORAGE MEDIUM

PRIORITY APPLICATIONS

This application is a U.S. National Stage Filing under 35 U.S.C. § 371 from International Application No. PCT/CN2023/108103, filed on Jul. 19, 2023, and published as WO2024/032336 on Feb. 15, 2024, which claims the benefit of priority to Chinese Application No. 202210946519.3, filed on Aug. 8, 2022; the benefit of priority of each of which is hereby claimed herein, and which applications and publication are hereby incorporated herein by reference in their entireties.

TECHNICAL FIELD

The present disclosure relates to a field of a positioning technology, and in particular, to a field of a three-dimensional positioning technology in an enclosed space, and specifically to a method and an apparatus of processing a positioning information, an electronic device, and a storage medium.

BACKGROUND

In a process of cargo transportation, flight cases, containers and other loading tools play a role of cargo containers and are basic units of transportation. Therefore, flight cases, containers and other loading tools are also a focus of detection in a security inspection process. During the security inspection process, if a suspicious object is detected, it is inevitable to take out the suspicious object for inspection.

Due to a complex internal environment of the flight cases, containers and other loading tools, in a related art, even if a virtual position of the suspicious object is detected by a tomography technology, it is difficult for a security personnel to take out the suspicious object from an interior of the flight cases, containers and other loading tools according to the virtual position, and it has a poor accuracy in positioning the suspicious object.

SUMMARY

In view of the above, the present disclosure provides a method and an apparatus of processing a positioning information, an electronic device, a storage medium, and a computer program product.

In an aspect of the present disclosure, a method of processing a positioning information is provided, including: acquiring, in response to a positioning request, a distance information of each of a plurality of base stations for a terminal device; determining, based on a plurality of distance information, a first position information of the terminal device in a first reference system determined based on the plurality of base stations; and determining a positioning information of the terminal device for a target object based on the first position information and a position information of the target object, where the position information of the target object is determined from a tomography result.

According to embodiments of the present disclosure, the plurality of base stations include a plurality of base station groups meeting a predetermined condition, and the predetermined condition indicates that a plurality of base stations in the base station group are not coplanar; the determining, based on a plurality of distance information, a first position information of the terminal device in a first reference system determined based on the plurality of base stations includes: determining, for each base station group, a second position information of the terminal device in the first reference system based on a plurality of distance information related to the base station group; and determining the first position information based on a plurality of second position information respectively related to the plurality of base station groups.

According to embodiments of the present disclosure, the plurality of base stations form a detection space including an internal space of a cuboid-shaped flight case, the plurality of base stations include eight UWB base stations fixed at vertices on an outer side of the flight case, the eight UWB base stations are divided into two base station groups, a first base station group includes three UWB base stations on a first surface of the flight case and one UWB base station on a second surface of the flight case, a second base station group includes one UWB base station on the first surface and three UWB base stations on the second surface, and the first surface and the second surface are opposite to each other.

According to embodiments of the present disclosure, the determining the first position information based on a plurality of second position information respectively related to the plurality of base station groups includes: acquiring a set of historical position information of the terminal device in the first reference system; determining, based on the set of historical position information, a predicted position information of the terminal device at a request initiation moment of the positioning request; and determining the first position information based on the predicted position information and the plurality of second position information.

According to embodiments of the present disclosure, the determining, based on the set of historical position information, a predicted position information of the terminal device at a request initiation moment of the positioning request includes: generating a displacement curve of the terminal device based on the set of historical position information; and predicting a position of the terminal device at the request initiation moment based on the displacement curve, so as to obtain the predicted position information.

According to embodiments of the present disclosure, the set of historical position information includes a plurality of historical position information, the historical position information is configured with a recording moment; the generating a displacement curve of the terminal device based on the set of historical position information includes: extracting, from the set of historical position information, a plurality of first target historical position information with recording moments closest to the request initiation moment; performing an interpolation on the plurality of first target historical position information by using a Catmull-Rom interpolation algorithm, so as to obtain a plurality of interpolation point position information; and generating the displacement curve of the terminal device based on the plurality of target historical position information and the plurality of interpolation point position information.

According to embodiments of the present disclosure, the set of historical position information includes a plurality of historical position information, the historical position information is configured with a recording moment; the generating a displacement curve of the terminal device based on the set of historical position information includes: extracting, from the set of historical position information, a plurality of first target historical position information with recording moments closest to the request initiation moment;

performing an interpolation on the plurality of first target historical position information by using a Catmull-Rom interpolation algorithm, so as to obtain a plurality of interpolation point position information; and generating the displacement curve of the terminal device based on the plurality of first target historical position information and the plurality of interpolation point position information.

According to embodiments of the present disclosure, the determining the first position information based on the predicted position information and the plurality of second position information includes: calculating, for each second position information, a distance between a coordinate indicated by the predicted position information and a coordinate indicated by the second position information, so as to obtain a distance value; determining a target distance value from a plurality of distance values respectively related to the plurality of second position information, where the target distance value is a minimum value in the plurality of distance values; and determining the second position information related to the target distance value as the first position information.

According to embodiments of the present disclosure, the determining the first position information based on a plurality of second position information respectively related to the plurality of base station groups includes: determining information weights respectively related to the plurality of second position information based on signal attenuation amounts of the plurality of base station groups; and determining the first position information based on the plurality of second position information and the information weights respectively related to the plurality of second position information.

According to embodiments of the present disclosure, the determining the first position information based on a plurality of second position information respectively related to the plurality of base station groups includes: calculating an average value of coordinates indicated by the plurality of second position information, so as to obtain the first position information.

According to embodiments of the present disclosure, the determining a positioning information of the terminal device for a target object based on the first position information and a position information of the target object includes: determining a second reference system based on the tomography result; processing the position information of the target object by using a conversion strategy between the first reference system and the second reference system, so as to obtain a third position information of the target object in the first reference system; and generating the positioning information based on the first position information and the third position information.

According to embodiments of the present disclosure, the method further includes: sending the positioning information to the terminal device, so as to display the positioning information on the terminal device.

According to embodiments of the present disclosure, the method further includes: scanning a detection space formed by the plurality of base stations by using an electronic computer tomography scanner, so as to obtain the tomography result.

In another aspect of the present disclosure, an apparatus of processing a positioning information is provided, including: an acquisition module configured to acquire, in response to a positioning request, a distance information of each of a plurality of base stations for a terminal device; a first determination module configured to determine, based on a plurality of distance information, a first position information of the terminal device in a first reference system determined based on the plurality of base stations; and a second determination module configured to determine a positioning information of the terminal device for a target object based on the first position information and a position information of the target object, where the position information of the target object is determined from a tomography result.

In another aspect of the present disclosure, an electronic device is provided, including: one or more first processors; and a memory for storing one or more instructions, where the one or more instructions are configured to, when executed by the one or more processors, cause the one or more first processors to implement the method described above.

In another aspect of the present disclosure, a computer readable storage medium having computer executable instructions therein is provided, and the instructions are configured to, when executed, implement the method described above.

In another aspect of the present disclosure, a computer program product containing computer executable instructions is provided, and the instructions are configured to, when executed, implement the method described above.

BRIEF DESCRIPTION OF THE DRAWINGS

The above and other objectives, features and advantages of the present disclosure will be clearer with following descriptions of the present disclosure with reference to the accompanying drawings, in which.

DETAILED DESCRIPTION OF EMBODIMENTS

Figure 1:
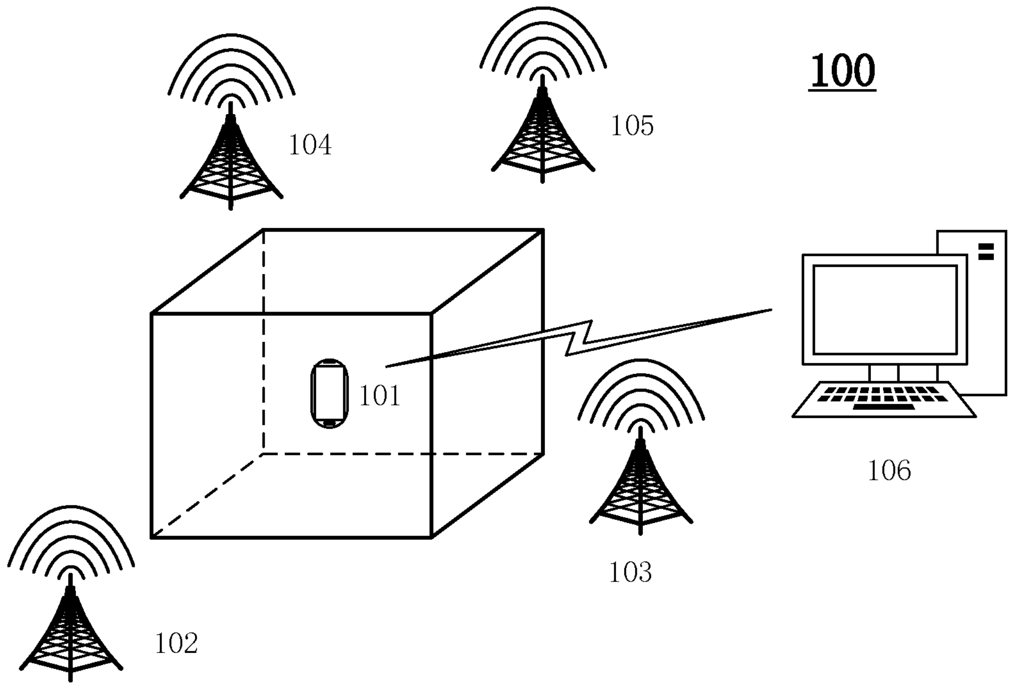
FIG. 1 schematically shows an exemplary system architecture to which a method and an apparatus of processing a positioning information may be applied according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of embodiments of the present disclosure. However, it is clear that one or more embodiments may also be implemented without these specific details. In addition, in the following description, descriptions of well-known structures and technologies are omitted to avoid unnecessarily obscuring the concepts of the present disclosure.

Terms used herein are for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

In a case of using the expression similar to "at least one of A, B and C", it should be explained according to the meaning of the expression generally understood by those skilled in the art (for example, "a system including at least one of A, B and C" should include but not be limited to a system including A alone, a system including B alone, a system including C alone, a system including A and B, a system including A and C, a system including B and C, and/or a system including A, B and C). In a case of using the expression similar to "at least one of A, B or C", it should be explained according to the meaning of the expression generally understood by those skilled in the art (for example, "a system including at least one of A, B or C" should include but not be limited to a system including A alone, a system including B alone, a system including C alone, a system including A and B, a system including A and C, a system including B and C, and/or a system including A, B and C).

In a process of cargo transportation, flight cases and other loading tools play a role of cargo containers and are basic units of transportation. Therefore, flight cases and other loading tools are also a focus of detection in a security inspection process. In a case of a large number of flight cases, how to efficiently determine a position of a suspicious object and guide an inspector to take out the suspicious object is of great significance for improving an efficiency of the security inspection.

As a computed tomography (CT) technology may be implemented to display an internal information of an object, the CT technology is widely used in the security inspection of large cargo. A combination of the CT technology and a deep learning technology may be implemented to relatively conveniently detect a spatial position of a suspicious object. A virtual position of the suspicious object obtained by the CT technology may provide an inspector with a rough understanding of an internal position of the suspicious object in the flight case. However, it is generally difficult for an inspector inside the flight case to determine a specific position where the inspector is located. Due to a complex internal environment of the flight case, it is still a difficult task to find a suspicious object at a designated position.

In the related art, UWB (Ultra-WideBand) technology-based virtual positioning may be relatively maturely applied to object positioning, and may generally reach a level of 10 cm. Such technology includes two mature algorithms or solutions, namely a bidirectional ranging-based TOF (Time of Flight) solution and a TDOA (Time Difference of Arrival) method using high-precision time synchronization. The TOF algorithm may be implemented to draw a circle with a base station as a center and a distance between a tag and the base station as a radius, and find a common intersection point of a plurality of circles as a searched tag position. Such solution has a simple algorithm and a high accuracy, and it requires the base station and the tag to transmit signals to determine the distance between the two. In the TDOA, it is required to preset a high-precision time synchronization between base stations, draw hyperbolic curves with the base stations as centers according to a time difference between broadcasts from the tag to the base stations, and find a common intersection point of a plurality of hyperbolic curves as the tag position. The TODA has advantages of low power consumption and large capacity. However, the UWB technology is commonly used for personnel positioning in an open region. In a case of a flight case with a size of only a few meters, the solutions in the related art may fail to meet requirements for positioning accuracy.

In view of this, embodiments of the present disclosure provide a method of positioning a target object in a detection space, in which a spatial positioning is performed based on the UWB technology in combination with an object detection result obtained by the CT technology, a layout of the base stations is adjusted according to the size of the flight case, and the accuracy of object positioning is improved by means of data fitting, so that a low-precision positioning solution originally applied in a large scene may also adapt to small-scene and high-precision positioning requirements. By displaying the positioning information through a terminal device, it is possible to effectively improve an efficiency of taking out the target object.

Specifically, embodiments of the present disclosure provide a method and an apparatus of processing a positioning information. The method includes: acquiring, in response to a positioning request, a distance information of each of a plurality of base stations for a terminal device; determining, based on a plurality of distance information, a first position information of the terminal device in a first reference system determined based on the plurality of base stations; and determining a positioning information of the terminal device for a target object based on the first position information and a position information of the target object, where the position information of the target object is determined from a tomography result.

It should be noted that a plurality of operations shown in the flowcharts in embodiments of the present disclosure may be executed in a non-sequential manner or may be executed simultaneously, unless a sequence of execution of different operations or a sequence of execution of different operations in terms of technical implementation is clearly stated.

FIG. 1 schematically shows an exemplary system architecture to which a method and an apparatus of processing a positioning information may be applied according to embodiments of the present disclosure. It should be noted that FIG. 1 is just an example of the system architecture to which embodiments of the present disclosure may be applied, so as to help those skilled in the art understand technical contents of the present disclosure. However, it does not mean that embodiments of the present disclosure may not be applied to other devices, systems, environments or scenarios.

As shown in FIG. 1, a system architecture 100 according to such embodiments may include a terminal device 101 inside a detection space, and base stations 102, 103, 104 and 105 and a terminal device 106 outside the detection space. The detection space may be an internal space of any enclosed container including but not limited to a flight case, a container, etc.

The terminal device 101 may be various mobile electronic devices with a display screen and supporting wireless communication, including but not limited to smart phones, tablet computers, laptop computers, etc.

The base stations 102, 103, 104 and 105 may interact with the terminal devices 101 and 106 through wireless communication. The terminal device 101 may be bound with a tag for positioning, so that the base stations 102, 103, 104 and 105 may position the terminal device 101 through TOF, TDOA and other solutions.

The terminal device 106 may be various electronic devices with processors, including but not limited to desktop computers, servers, etc.

It should be noted that the method of processing the positioning information provided in embodiments of the present disclosure may generally be performed by the terminal device 106. Accordingly, the apparatus of processing the positioning information provided in embodiments of the present disclosure may generally be provided in the terminal device 106. A positioning request may be generated by the terminal device 101 through a user and sent to the terminal device 106. Alternatively, the base stations 102, 103, 104 and 105 may also generate and send positioning requests to the terminal device 106 periodically. Upon receiving the positioning request, the terminal device 106 may acquire a distance information of the base stations 102, 103, 104 and 105 with respect to the terminal device 101. Based on the distance information, the terminal device 106 may generate a positioning information by combining the position information of the target object, and return the positioning information to the terminal device 101. The method of processing the positioning information provided in embodiments of the present disclosure may also be performed by a terminal device different from the terminal device 106, a server or a server cluster capable of communicating with the terminal device 106. Accordingly, the apparatus of processing the positioning information provided in embodiments of the present disclosure may also be provided in a terminal device different from the terminal device 106, a server or a server cluster capable of communicating with the terminal device 106. Alternatively, the method of processing the positioning information provided in embodiments of the present disclosure may also be performed by the terminal device 101. Accordingly, the apparatus of processing the positioning information provided in embodiments of the present disclosure may also be provided in the terminal device 101. The terminal device 101 itself may respond to a generated positioning request, or the base stations 102, 103, 104 and 105 may actively send positioning requests to the terminal device 101. In response to the positioning request, the terminal device 101 may acquire the distance information from the base stations 102, 103, 104 and 105, and generate a positioning information based on the distance information and the position information of the target object.

It should be understood that the number of terminal devices, detection space and base stations shown in FIG. 1 are just schematic. According to implementation needs, any number of terminal devices, detection spaces and base stations may be provided.

Figure 2:
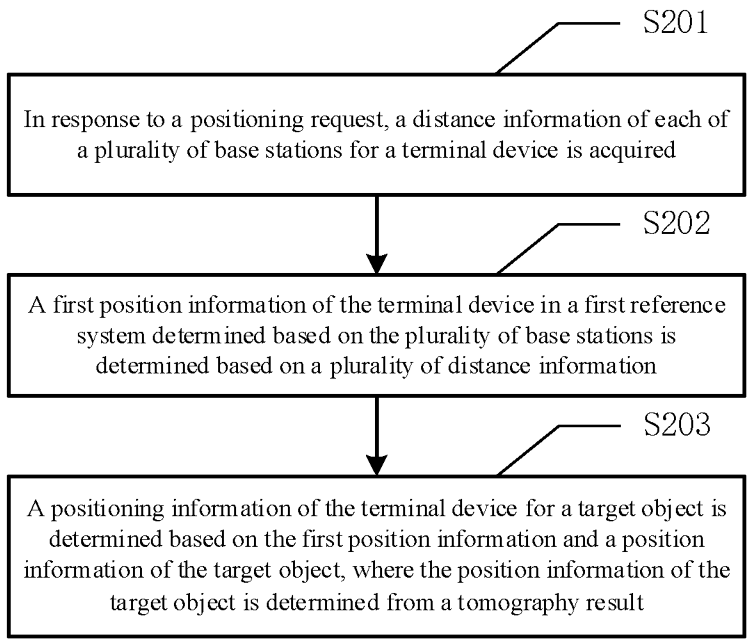
FIG. 2 schematically shows a flowchart of a method of processing a positioning information according to embodiments of the present disclosure.

FIG. 2 schematically shows a flowchart of a method of processing a positioning information according to embodiments of the present disclosure.

As shown in FIG. 2, the method includes operation S201 to operation S203.

In operation S201, in response to a positioning request, a distance information of each of a plurality of base stations for a terminal device is acquired.

In operation S202, a first position information of the terminal device in a first reference system determined based on the plurality of base stations is determined based on a plurality of distance information.

In operation S203, a positioning information of the terminal device for a target object is determined based on the first position information and a position information of the target object, where the position information of the target object is determined from a tomography result.

According to embodiments of the present disclosure, both the terminal device and the target object may be located inside the detection space. The detection space may be a space formed with the plurality of base stations as vertices, or may be an internal space of various enclosed containers, such as an internal space of a flight case, an internal space of a container, etc.

According to embodiments of the present disclosure, the terminal device may be a handheld terminal for an inspector. The terminal device may send a positioning request through wireless communication. The terminal device may be bound with a positioning tag.

According to embodiments of the present disclosure, the positioning request may refer to a request for positioning the target object. Before the inspector enters the detection space with the terminal device, a relevant information of the target object may be pre-recorded in the terminal device. The positioning request may be a request actively initiated by the inspector through the terminal device to position the target object. Alternatively, timed tasks for positioning the target object may be respectively written into the plurality of base stations. After the timed task is triggered, the base station may generate the positioning request.

According to embodiments of the present disclosure, the distance information may be generated by the base station based on TOF, TDOA and other solutions, and the distance information may indicate a distance between the base station and the terminal device.

According to embodiments of the present disclosure, the first reference system may be determined based on positions of the plurality of base stations, or the first reference system may also be determined based on a position of the detection space. The plurality of base stations may have fixed coordinates in the first reference system. The first position information may indicate the coordinate of the terminal device in the first reference system.

According to embodiments of the present disclosure, the tomography result may be obtained by scanning the detection space using a CT device. After the tomography result is obtained, various objects displayed in the tomography result may be classified using an image processing technology, so as to determine suspicious objects. The target object may be any one of the determined suspicious objects.

According to embodiments of the present disclosure, the positioning information may include information such as a direction and a distance of the terminal device with respect to the target object, which is not limited here.

According to embodiments of the present disclosure, the terminal device may be provided with a positioning tag to achieve the positioning of the terminal device by the base station. When positioning the target object in response to the positioning request, it is possible to determine the first position information of the terminal device according to the positioning information of each base station for the terminal device, and then process the first position information and the position information of the target object determined from the tomography result, so as to determine the positioning information of the terminal device for the target object. The positioning information may be used to guide the inspector holding the terminal device to find the target object in the detection space. Therefore, the technical problem of poor positioning accuracy for the target object in the security inspection process of the loading tool in the related art may be at least partially overcome, so that a positioning accuracy for the target object may be effectively improved.

The method shown in FIG. 2 will be further described with reference to FIG. 3A to FIG. 3B, FIG. 4, FIG. 5A to FIG. 5C, and FIG. 6 in conjunction with specific embodiments.

According to embodiments of the present disclosure, the plurality of base stations may include a plurality of base station groups meeting a predetermined condition. The predetermined condition may indicate that a plurality of base stations in a base station group are not coplanar. That is, each base station group may include at least four base stations, and the at least four base stations are not completely coplanar. Each base station may only belong to a single base station group, or may belong to a plurality of base station groups simultaneously, which is not limited here.

According to embodiments of the present disclosure, the plurality of base stations may form a detection space, which may be an internal space of a cuboid-shaped flight case, and the base station may be a UWB base station fixed at a vertex on an outer side of the flight case.

Figure 3A:
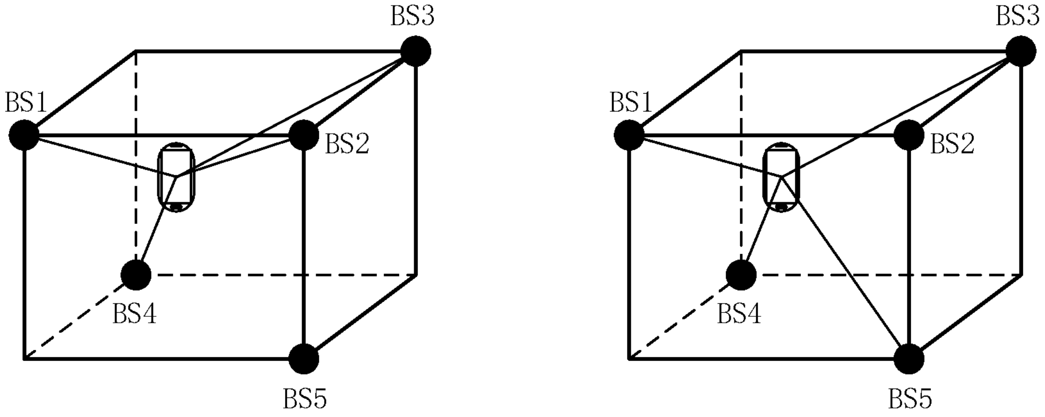
FIG. 3A schematically shows a schematic diagram of a layout of UWB base stations on an outer side of a flight case according to embodiments of the present disclosure.

FIG. 3A schematically shows a schematic diagram of a layout of UWB base stations on the outer side of the flight case according to embodiments of the present disclosure.

As shown in FIG. 3A, five UWB base stations BS1, BS2, BS3, BS4 and BS5 may be provided respectively at five vertices on an outer surface of the flight case. The five UWB base stations may be divided into two base station groups. One base station group includes four UWB base stations BS1, BS2, BS3 and BS4, as shown in a left figure of FIG. 3A. The other base station group includes four UWB base stations BS1, BS3, BS4 and BS5, as shown in a right figure of FIG. 3A. In each base station group, the four UWB base stations are not coplanar.

Figure 3B:
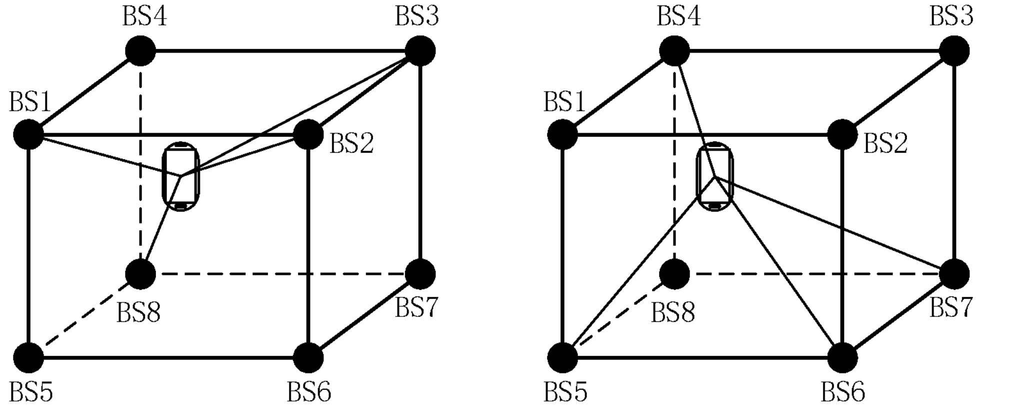
FIG. 3B schematically shows a schematic diagram of a layout of UWB base stations on an outer side of a flight case according to other embodiments of the present disclosure.

FIG. 3B schematically shows a schematic diagram of a layout of UWB base stations on the outer side of the flight case according to other embodiments of the present disclosure.

As shown in FIG. 3B, UWB base stations BS1, BS2, BS3, BS4, BS5, BS6, BS7 and BS8 may be provided respectively at eight vertices on the outer surface of the flight case. The eight UWB base stations may be divided into two base station groups. A first base station group may include three UWB base stations on a first surface of the flight case and one UWB base station on a second surface of the flight case, namely BS1, BS2, BS3 and BS8, a total of four UWB base stations, as shown in a left figure of FIG. 3B. A second base station group may include one UWB base station on the first surface and three UWB base stations on the second surface, namely BS4, BS5, BS6 and BS7, a total of four UWB base stations, as shown in a right figure of FIG. 3B. The first surface and the second surface may be two opposite surfaces on the flight case.

According to embodiments of the present disclosure, with the layout of three base stations on a same plane and the remaining base station on another plane, which means that the four base stations in the base station group are not coplanar, it is possible to avoid an occurrence of multiple solutions during height direction positioning, that is, a unique positioning result may be obtained by each base station group, so that a positioning error may be reduced to some extent. Moreover, with a symmetrical layout of two base station groups, a possibility of subsequent interpolation selection may be provided. In addition, by placing the base stations at the eight vertices of the flight case, it is possible to clearly distinguish the internal space from an external space, so that a positional solution in the external space may be removed.

Figure 4:
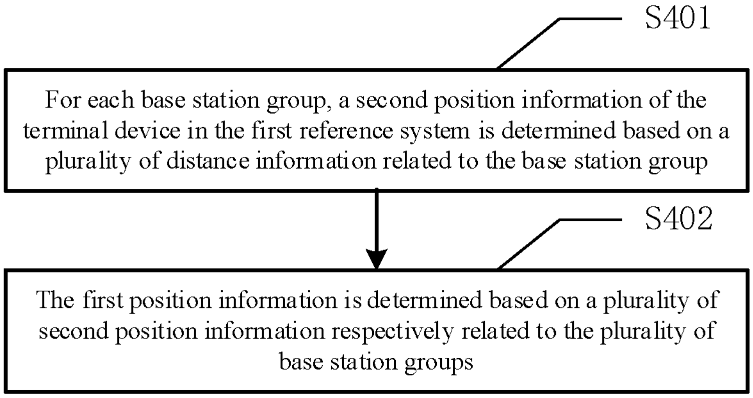
FIG. 4 schematically shows a flowchart of a method of determining a first position information according to embodiments of the present disclosure.

FIG. 4 schematically shows a flowchart of a method of determining the first position information according to embodiments of the present disclosure.

As shown in FIG. 4, the method includes operation S401 to operation S402.

In operation S401, for each base station group, a second position information of the terminal device in the first reference system is determined based on a plurality of distance information related to the base station group.

In operation S402, the first position information is determined based on a plurality of second position information respectively related to the plurality of base station groups.

According to embodiments of the present disclosure, the second position information measured by each base station group may be obtained by processing the distance information measured by each base station in the base station group using TOF, TDOA and other methods.

According to embodiments of the present disclosure, taking the layout of base stations shown in FIG. 3B as an example, a calculation process of processing the distance information measured by each base station in the base station group using the TOF method may be shown as Equation (1) to Equation (8), in which Equation (1) to Equation (4) show the calculation process of processing the distance information measured by the first base station group, and Equation (5) to Equation (8) show the calculation process of processing the distance information measured by the second base station group.

$$\sqrt{(x_{i1}-x_1)^2+(y_{i1}-y_1)^2+(z_{i1}-z_1)^2}=c\cdot\Delta_1 \quad (1)$$

$$\sqrt{(x_{i1}-x_2)^2+(y_{i1}-y_2)^2+(z_{i1}-z_2)^2}=c\cdot\Delta_2 \quad (2)$$

$$\sqrt{(x_{i1}-x_3)^2+(y_{i1}-y_3)^2+(z_{i1}-z_3)^2}=c\cdot\Delta_3 \quad (3)$$

$$\sqrt{(x_{i1}-x_8)^2+(y_{i1}-y_8)^2+(z_{i1}-z_8)^2}=c\cdot\Delta_8 \quad (4)$$

$$\sqrt{(x_{i2}-x_4)^2+(y_{i2}-y_4)^2+(z_{i2}-z_4)^2}=c\cdot\Delta_4 \quad (5)$$

$$\sqrt{(x_{i2}-x_5)^2+(y_{i2}-y_5)^2+(z_{i2}-z_5)^2}=c\cdot\Delta_5 \quad (6)$$

$$\sqrt{(x_{i2}-x_6)^2+(y_{i2}-y_6)^2+(z_{i2}-z_6)^2}=c\cdot\Delta_6 \quad (7)$$

$$\sqrt{(x_{i2}-x_7)^2+(y_{i2}-y_7)^2+(z_{i2}-z_7)^2}=c\cdot\Delta_7 \quad (8)$$

where $x_j$, j=1, 2, . . . , 8 represents an x-axis coordinate of a $j^{th}$ base station BSj in the first reference system; $y_j$, j=1, 2, . . . , 8 represents a y-axis coordinate of the $j^{th}$ base station BSj in the first reference system; $z_j$, j=1, 2, . . . , 8 represents a z-axis coordinate of the $j^{th}$ base station BSj in the first reference system; $\Delta_j$, j=1, 2, . . . , 8 represents a time of flight of a signal from the terminal device to the $j^{th}$ base station BSj; c represents a signal transmission speed; $c \cdot \Delta_j$, j=1, 2, . . . , 8 represents the distance information measured by the $j^{th}$ base station BSj; $P_1(x_{i1}, y_{i1}, z_{i1})$ represents the second position information determined for the first base station group; $P_2(x_{i2}, y_{i2}, z_{i2})$ represents the second position information determined for the second base station group.

According to embodiments of the present disclosure, when the plurality of base stations may be divided into more than two base station groups, the process of calculating the second position information according to the measured distance information of other base station groups may refer to Equation (1) to Equation (4) or Equation (5) to Equation (8) accordingly, which will not be repeated here.

According to embodiments of the present disclosure, the second position information determined by each base station group may be used as a candidate of a true position, and an information of the true position, that is, the first position information, may be calculated using a plurality of second position information.

For example, it is possible to calculate an average value of coordinates indicated by the plurality of second position information, so as to obtain the first position information, as shown in Equation (9).

$$P_0 = \frac{P_1 + \ldots + P_n}{n} \tag{9}$$

where $P_0$ represents the first position information; $P_n$ represents an $n^{th}$ second position information; n represents the number of base station groups.

For another example, information weights respectively related to the plurality of second position information may be determined based on signal attenuation amounts of the plurality of base station groups; then the first position information may be determined based on the plurality of second position information and the information weights respectively related to the plurality of second position information.

According to embodiments of the present disclosure, the signal attenuation amount may refer to an attenuation amount of a signal strength generated when a signal of the base station penetrates an object. The signal attenuation amount of each base station in the base station group may be calculated using Equation (10).

$$\Delta T = T - T_0 \tag{10}$$

where $\Delta T$ represents the signal attenuation amount, T represents an actual time of flight of the base station signal, and $T_0$ represents a time of flight of the base station signal in an open region in a case of the same distance.

According to embodiments of the present disclosure, the method of calculating the information weight of each second position information may be as shown in Equation (11).

$$w_k = \frac{\sum \Delta T_k}{\sum \Delta T_1 + \ldots + \sum \Delta T_n} \tag{11}$$

where $w_k$ represents the information weight of a $k^{th}$ second position information, $\Sigma\Delta T_k$ represents the signal attenuation amount of the base station group corresponding to the $k^{th}$ second position information.

According to embodiments of the present disclosure, the process of determining the first position information based on the plurality of second position information and the information weights respectively related to the plurality of second position information may be a process of performing a weighted summation on the plurality of second position information with the information weights as weight values, as shown in Equation (12).

$$P_0 = \sum_{k=1}^{n} w_k \times P_k \tag{12}$$

For another example, the first position information may be determined by performing an interpolation on the plurality of second position information.

For still another example, the second position information closest to a position information recorded at a previous moment may be selected from the plurality of second position information as the first position information.

According to embodiments of the present disclosure, the determination of the first position information may be performed in any way, which is not limited here.

According to embodiments of the present disclosure, by determining the information of the true position, that is, the first position information based on the plurality of second position information as described above, it is possible to reduce an error between the measured first position information and the information of the actual position without introducing other information, so that the positioning accuracy may be effectively improved.

Figure 5A:
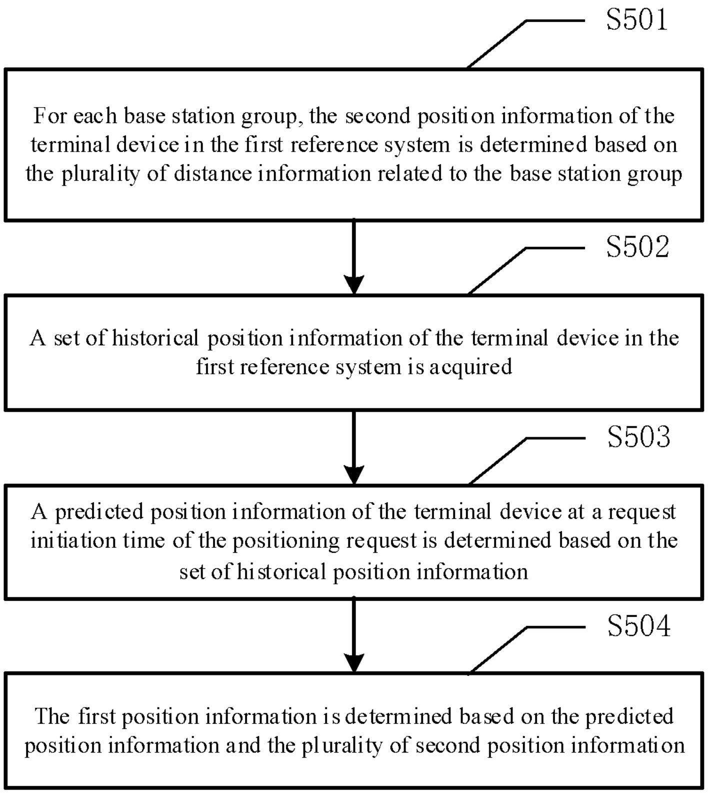
FIG. 5A schematically shows a flowchart of a method of determining a first position information according to other embodiments of the present disclosure.

FIG. 5A schematically shows a flowchart of a method of determining the first position information according to other embodiments of the present disclosure.

As shown in FIG. 5A, the method includes operation S501 to operation S504.

In operation S501, for each base station group, the second position information of the terminal device in the first reference system is determined based on the plurality of distance information related to the base station group.

In operation S502, a set of historical position information of the terminal device in the first reference system is acquired.

In operation S503, a predicted position information of the terminal device at a request initiation moment of the positioning request is determined based on the set of historical position information.

In operation S504, the first position information is determined based on the predicted position information and the plurality of second position information.

According to embodiments of the present disclosure, the set of historical position information may include a plurality of historical position information, and the historical position information may be provided with a recording moment, i.e., the moment when the historical position information is recorded.

According to embodiments of the present disclosure, the plurality of historical position information in the set of historical position information may be recorded according to a fixed period, that is, a recording moment difference between adjacent historical position information may be a fixed value.

According to embodiments of the present disclosure, the determination of the predicted position information of the terminal device at the request initiation moment of the positioning request based on the set of historical position information may be achieved by any trajectory prediction model or algorithm, such as LSTM (Long Short-Term Memory), CNN (Convolutional Neural Network), interpolation algorithm, etc., which is not limited here.

According to embodiments of the present disclosure, operation S503 may include the following operations.

A displacement curve of the terminal device is generated based on the set of historical position information. A position of the terminal device at the request initiation moment is predicted based on the displacement curve, so as to obtain the predicted position information.

According to embodiments of the present disclosure, the displacement curve may be a movement path of the inspector holding the terminal device, which is obtained by fitting.

According to embodiments of the present disclosure, as a movement of the inspector is a continuous process, the movement path may be considered as a smooth curve. Based on this, by performing a fitting on the displacement curve of the position information at the past moment and then predicting the position information at a current moment using a fitting result, it is possible to obtain a more accurate predicted position information. By processing the plurality of second position information using the predicted position information, it is possible to obtain a reliable first position information, so that the positioning accuracy may be improved.

According to embodiments of the present disclosure, operation S504 may include the following operations.

For each second position information, a distance between a coordinate indicated by the predicted position information and a coordinate indicated by the second position information is calculated, so as to obtain a distance value. A target distance value is determined from a plurality of distance values respectively related to the plurality of second position information, where the target distance value is a minimum value in the plurality of distance values. The second position information related to the target distance value is determined as the first position information.

According to embodiments of the present disclosure, the distance between the predicted position information and the second position information may be calculated using any distance algorithm, such as Euclidean distance algorithm, Manhattan distance algorithm, Chebyshev distance algorithm, etc., which is not limited here.

According to embodiments of the present disclosure, by performing a fitting on the plurality of second position information using the predicted position information to obtain the first position information, the first position information obtained by positioning may be aligned with a motion trend of the terminal device, so that the error between the first position information and the actual position may be reduced, and the positioning accuracy may be improved.

Figure 5B:
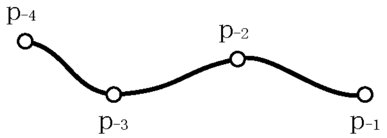
FIG. 5B schematically shows a schematic diagram of a displacement curve obtained by performing a fitting using an interpolation algorithm according to other embodiments of the present disclosure.

FIG. 5B schematically shows a schematic diagram of a displacement curve obtained by performing a fitting using an interpolation algorithm according to other embodiments of the present disclosure.

As shown in FIG. 5B, the displacement curve may be obtained by performing a fitting on the plurality of historical position information in the set of historical position information using a Catmull-Rom interpolation algorithm.

According to embodiments of the present disclosure, performing the fitting on the displacement curve using the Catmull-Rom interpolation algorithm may include the following operations.

A plurality of first target historical position information with recording moments closest to the request initiation moment are extracted from the set of historical position information. An interpolation is performed on the plurality of first target historical position information by using a Catmull-Rom interpolation algorithm, so as to obtain a plurality of interpolation point position information. The displacement curve of the terminal device is generated based on the plurality of first target historical position information and the plurality of interpolation point position information.

According to embodiments of the present disclosure, when performing the interpolation using the Catmull-Rom interpolation algorithm, it is needed to input four consecutive points, and an interpolation interval is between middle two points. For example, for four consecutive first target historical position information $p_{-4}$, $p_{-3}$, $p_{-2}$ and $p_{-1}$ obtained from the set of historical position information, when performing the interpolation using the four first target historical position information, an interpolation point position information between the middle two first target historical position information, that is, an interpolation point position information between $p_{-3}$ and $p_{-2}$ may be determined, as shown in Equation (13).

$$p_u = \begin{bmatrix} 1 & u & u^2 & u^3 \end{bmatrix} \begin{bmatrix} 0 & 1 & 0 & 0 \\ -\tau & 0 & \tau & 0 \\ 2\tau & \tau - 3 & 3 - 2\tau & -\tau \\ -t & 2 - \tau & \tau - 2 & \tau \end{bmatrix} \begin{bmatrix} p_1 \\ p_2 \\ p_3 \\ p_4 \end{bmatrix} \tag{13}$$

where $p_u$ represents the interpolation point position information at moment u, and u is within an interval [−3, −2]; τ is a hyper-parameter used to affect a degree of curvature of the displacement curve obtained by fitting, and r may be any value between 0 and 1.

According to embodiments of the present disclosure, when performing an interpolation using the Catmull-Rom interpolation algorithm, the interpolation between two points on edges may be achieved by constructing a starting point or an ending point. For example, for the four consecutive first target historical position information $p_{-4}$, $p_{-3}$, $p_{-2}$ and $p_{-1}$ obtained from the set of historical position information, when it is needed to perform a fitting to obtain a displacement curve between $p_{-2}$ and $p_{-1}$, it is possible to construct an ending point, which may be, for example, $p'_{-1}=2p_{-1}-p_{-2}$. Then, $p_{-4}$, $p_{-3}$, $p_{-2}$ and $p_{-1}$ and the constructed ending point may be substituted into Equation (13) to obtain the interpolation point position information between $p_{-2}$ and $p_{-1}$.

According to embodiments of the present disclosure, by performing a fitting on the recorded historical position information to obtain the displacement curve, it is possible to effectively improve a credibility of the displacement curve obtained by fitting, so that a reliable auxiliary information may be provided for the determination of the first position information of the inspector, and then the positioning accuracy may be improved indirectly.

Figure 5C:
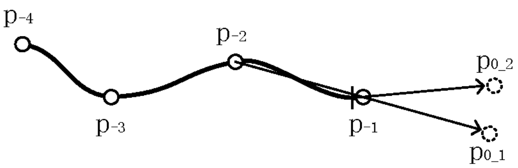
FIG. 5C schematically shows a schematic diagram of predicting a position information using a displacement curve according to other embodiments of the present disclosure.

FIG. 5C schematically shows a schematic diagram of predicting a position information using a displacement curve according to other embodiments of the present disclosure.

As shown in FIG. 5C, the displacement curve may be obtained using the method described in FIG. 5B.

According to embodiments of the present disclosure, after the displacement curve is obtained by performing a fitting using the Catmull-Rom interpolation algorithm, the predicted position information may be obtained by the following operations.

A second target historical position information is determined from the plurality of first target historical position information, where the recording moment of the second target historical position information is closest to the request initiation moment. A predicted velocity information associated with the second target historical position information is determined based on the displacement curve. A predicted displacement information is determined based on the predicted velocity information, the request initiation moment, and the recording moment of the second target historical position information. The predicted position information is determined based on the predicted displacement information and the second target historical position information.

According to embodiments of the present disclosure, the second target historical position information may refer to a most recently recorded historical position information. For example, the historical position information recorded in the set of historical position information may be sorted as $p_m$, $p_{m-1}$, . . . , $p_{-2}$, $p_{-1}$ in an ascending order of recording moment, and the second target historical position information may refer to the historical position information $p_{-1}$.

According to embodiments of the present disclosure, the predicted velocity information may refer to an instantaneous velocity of the terminal device at the recording moment of the second target historical position information, which may be calculated by Equation (14).

$$v = \frac{p_{-1} - p_{-(1+\Delta t)}}{\Delta t} \tag{14}$$

where v represents the predicted velocity information; $p_{-1}$ represents the second target historical position information; $p_{-(1+\Delta t)}$ may be calculated using Equation (13); Δt may be a hyper-parameter.

According to embodiments of the present disclosure, it may be assumed that the terminal device is in uniform motion between the request initiation moment and the recording moment of the second target historical position information, and the predicted displacement information may be calculated by Equation (15).

$$\Delta p = v \times (t_0 - t_{-1}) \tag{15}$$

where Δp represents the predicted displacement information, $t_0$ represents the request initiation moment, $t_{-1}$ represents the recording moment of the second target historical position information.

According to embodiments of the present disclosure, the predicted position information may be obtained by performing a summation on the second target historical position and the predicted displacement information, as shown in Equation (16).

$$p' = p_{-1} + \Delta p \tag{16}$$

where p' represents the predicted position information.

In some embodiments, the predicted velocity information may be a vector information, that is, the predicted velocity information may include a velocity value and an azimuth information calculated by Equation (14). The predicted position information may also be determined by the azimuth information.

According to embodiments of the present disclosure, the azimuth information may be determined according to a value of Δt. As shown in FIG. 5C, when Δt takes a value of 1, the predicted position information $p_{0\_1}$ may be obtained. When the value of Δt is small enough, such as 0.01, the predicted position information $p_{0\_2}$ may be obtained. It is clear that the smaller the value of Δt, the higher the reliability of the predicted position information. Therefore, $p_{0\_2}$ may be selected as the predicted position information.

According to embodiments of the present disclosure, after the predicted position information is determined, the first position information may be determined from the plurality of second position information by using the predicted position information. For example, the distance between the predicted position information and each second position information may be calculated, and the second position information corresponding to the shortest record may be selected as the first position information.

According to embodiments of the present disclosure, the detection space formed by the plurality of base stations may be scanned using an electronic computer tomography scanner, so as to obtain a tomography result, and the position information of the target object may be determined from the tomography result.

According to embodiments of the present disclosure, a second reference system may be determined based on the tomography result. After the first position information and the position information of the target object are determined, the positioning information of the terminal device for the target object may be determined based on the first position information and the position information of the target object by means of a coordinate system conversion between the first reference system and the second reference system.

Figure 6:
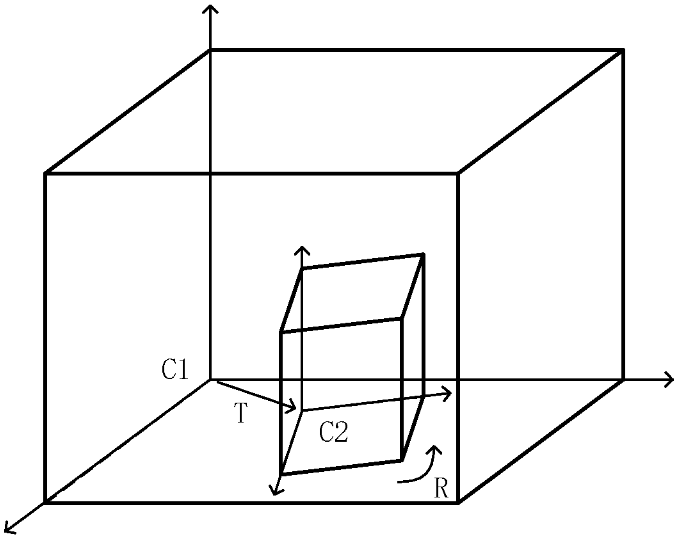
FIG. 6 schematically shows a schematic diagram of a coordinate system conversion according to embodiments of the present disclosure.

FIG. 6 schematically shows a schematic diagram of a coordinate system conversion according to embodiments of the present disclosure.

As shown in FIG. 6, the coordinate system conversion may be achieved by converting the coordinates in the second reference system to the coordinates in the first reference system, that is, processing the position information of the target object using a conversion strategy between the first reference system and the second reference system, so as to obtain the third position information of the target object in the first reference system.

According to embodiments of the present disclosure, a process of the coordinate system conversion may be as shown in Equation (17).

$$C_1 = C_2 \times R + T \tag{17}$$

where $C_1$ represents the first reference system; $C_2$ represents the second reference system; R represents a rotation angle deviation between the first reference system and the second reference system; T represents a displacement deviation between the first reference system and the second reference system. The rotation angle deviation and the displacement deviation may be determined using a plurality of corresponding points in the first reference system and the second reference system, which will not be further discussed here.

According to embodiments of the present disclosure, a process of converting the position information of the target object into the third position information in the first reference system may be as shown in Equation (18).

$$P'_{C_2} = P_{C_2} \times R + T \tag{18}$$

where $P'_{C_2}$ represents the third position information, and $P_{C_2}$ represents the position information of the target object.

According to embodiments of the present disclosure, after the first position information and the third position information are determined, a positioning information may be further generated based on the first position information and the third position information. The positioning information may include information such as a direction and a distance of the terminal device with respect to the target object.

According to embodiments of the present disclosure, after generating the positioning information in response to the positioning request, the external terminal device may send the positioning information to the terminal device, so that the positioning information may be displayed on the terminal device. For example, a three-dimensional display system based on the first reference system may be constructed in the terminal device. After receiving positioning information, the terminal device may display the first position information and the third position information on a display screen of the terminal device, and show the azimuth information and the distance information of the current position with respect to the target object.

According to embodiments of the present disclosure, by displaying the position of the terminal device and the position of the target object in real-time on the terminal device, the position of the inspector may be clearly shown to the inspector, so that a subsequent search direction may be adjusted according to the positioning information, thereby improving the detection efficiency of the object.

Figure 7:
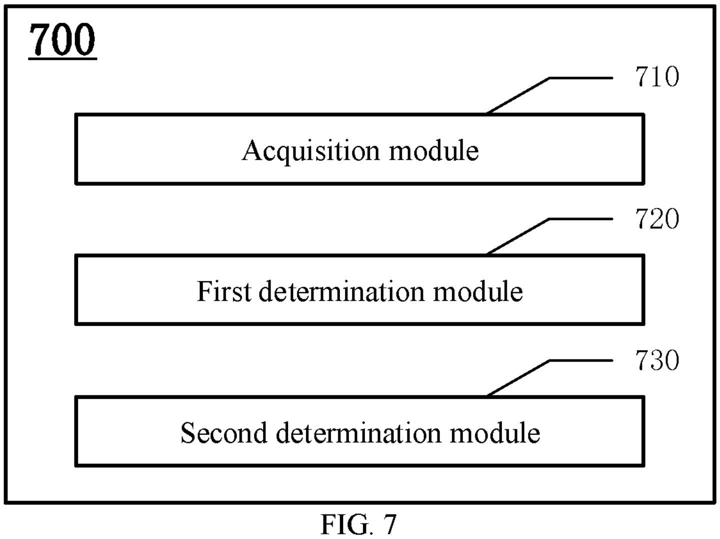
FIG. 7 schematically shows a block diagram of an apparatus of processing a positioning information according to embodiments of the present disclosure.

FIG. 7 schematically shows a block diagram of an apparatus of processing a positioning information according to embodiments of the present disclosure.

As shown in FIG. 7, an apparatus 700 of processing a positioning information includes an acquisition module 710, a first determination module 720, and a second determination module 730.

The acquisition module 710 is used to acquire, in response to a positioning request, a distance information of each of a plurality of base stations for a terminal device.

The first determination module 720 is used to determine, based on a plurality of distance information, a first position information of the terminal device in a first reference system determined based on the plurality of base stations.

The second determination module 730 is used to determine a positioning information of the terminal device for a target object based on the first position information and a position information of the target object, where the position information of the target object is determined from a tomography result.

According to embodiments of the present disclosure, the terminal device may be provided with a positioning tag to achieve the positioning of the terminal device by the base station. When positioning the target object in response to the positioning request, it is possible to determine the first position information of the terminal device according to the positioning information of each base station for the terminal device, and then process the first position information and the position information of the target object determined from the tomography result, so as to determine the positioning information of the terminal device for the target object. The positioning information may be used to guide the inspector holding the terminal device to find the target object in the detection space. Therefore, the technical problem of poor positioning accuracy for the target object in the security inspection process of the loading tool in the related art may be at least partially overcome, so that a positioning accuracy for the target object may be effectively improved.

According to embodiments of the present disclosure, the plurality of base stations include a plurality of base station groups meeting a predetermined condition, and the predetermined condition indicates that a plurality of base stations in the base station group are not coplanar.

According to embodiments of the present disclosure, the first determination module 720 includes a first determination sub-module and a second determination sub-module.

The first determination sub-module is used to determine, for each base station group, a second position information of the terminal device in the first reference system based on a plurality of distance information related to the base station group.

The second determination sub-module is used to determine the first position information based on a plurality of second position information respectively related to the plurality of base station groups.

According to embodiments of the present disclosure, the plurality of base stations form a detection space including an internal space of a cuboid-shaped flight case, the plurality of base stations include eight UWB base stations fixed at vertices on an outer side of the flight case, the eight UWB base stations are divided into two base station groups, a first base station group includes three UWB base stations on a first surface of the flight case and one UWB base station on a second surface of the flight case, a second base station group includes one UWB base station on the first surface and three UWB base stations on the second surface, and the first surface and the second surface are opposite to each other.

According to embodiments of the present disclosure, the second determination sub-module includes a first determination unit, a second determination unit, and a third determination unit.

The first determination unit is used to acquire a set of historical position information of the terminal device in the first reference system.

The second determination unit is used to determine, based on the set of historical position information, a predicted position information of the terminal device at a request initiation moment of the positioning request.

The third determination unit is used to determine the first position information based on the predicted position information and the plurality of second position information.

According to embodiments of the present disclosure, the second determination unit includes a first determination sub-unit and a second determination sub-unit.

The first determination sub-unit is used to generate a displacement curve of the terminal device based on the set of historical position information.

The second determination sub-unit is used to predict a position of the terminal device at the request initiation moment based on the displacement curve, so as to obtain the predicted position information.

According to embodiments of the present disclosure, the set of historical position information includes a plurality of historical position information, and the historical position information is configured with a recording moment.

According to embodiments of the present disclosure, the first determination sub-unit includes a first determination component, a second determination component, and a third determination component.

The first determination component is used to extract, from the set of historical position information, a plurality of first target historical position information with recording moments closest to the request initiation moment.

The second determination component is used to perform an interpolation on the plurality of first target historical position information by using a Catmull-Rom interpolation algorithm, so as to obtain a plurality of interpolation point position information.

The third determination component is used to generate the displacement curve of the terminal device based on the plurality of first target historical position information and the plurality of interpolation point position information.

According to embodiments of the present disclosure, the second determination sub-unit includes a fourth determination component, a fifth determination component, a sixth determination component, and a seventh determination component.

The fourth determination component is used to determine a second target historical position information from the plurality of first target historical position information, where a recording moment of the second target historical position information is closest to the request initiation moment.

The fifth determination component is used to determine, based on the displacement curve, a predicted velocity information associated with the second target historical position information.

The sixth determination component is used to determine a predicted displacement information according to the predicted velocity information, the request initiation moment, and the recording moment of the second target historical position information.

The seventh determination component is used to determine the predicted position information based on the predicted displacement information and the second target historical position information.

According to embodiments of the present disclosure, the third determination unit includes a third determination sub-unit, a fourth determination sub-unit, and a fifth determination sub-unit.

The third determination sub-unit is used to calculate, for each second position information, a distance between a coordinate indicated by the predicted position information and a coordinate indicated by the second position information, so as to obtain a distance value.

The fourth determination sub-unit is used to determine a target distance value from a plurality of distance values respectively related to the plurality of second position information, where the target distance value is a minimum value in the plurality of distance values.

The fifth determination sub-unit is used to determine the second position information related to the target distance value as the first position information.

According to embodiments of the present disclosure, the second determination sub-module includes a fourth determination unit and a fifth determination unit.

The fourth determination unit is used to determine information weights respectively related to the plurality of second position information based on signal attenuation amounts of the plurality of base station groups.

The fifth determination unit is used to determine the first position information based on the plurality of second position information and the information weights respectively related to the plurality of second position information.

According to embodiments of the present disclosure, the second determination sub-module includes a sixth determination unit.

The sixth determination unit is used to calculate an average value of coordinates indicated by the plurality of second position information, so as to obtain the first position information.

According to embodiments of the present disclosure, the second determination module 730 includes a third determination sub-module, a fourth determination sub-module, and a fifth determination sub-module.

The third determination sub-module is used to determine a second reference system based on the tomography result.

The fourth determination sub-module is used to process the position information of the target object by using a conversion strategy between the first reference system and the second reference system, so as to obtain a third position information of the target object in the first reference system.

The fifth determination sub-module is used to generate the positioning information based on the first position information and the third position information.

According to embodiments of the present disclosure, the apparatus 700 of processing the positioning information may further include a sending module.

The sending module is used to send the positioning information to the terminal device, so as to display the positioning information on the terminal device.

According to embodiments of the present disclosure, the apparatus 700 of processing the positioning information may further include a scanning module.

The scanning module is used to scan a detection space formed by the plurality of base stations by using an electronic computer tomography scanner, so as to obtain the tomography result.

Any number of the modules, sub-modules, units, sub-units and components according to embodiments of the present disclosure, or at least part of functions of any number of them may be implemented in one module. Any one or more of the modules, sub-modules, units, sub-units and components according to embodiments of the present disclosure may be split into a plurality of modules for implementation. Any one or more of the modules, sub-modules, units, sub-units and components according to embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of three implementation modes of software, hardware and firmware or an appropriate combination thereof. Alternatively, one or more of the modules, sub-modules, units, sub-units and components according to embodiments of the present disclosure may be at least partially implemented as a computer program module that, when executed, performs the corresponding functions.

For example, any number of the acquisition module 710, the first determination module 720 and the second determination module 730 may be combined into one module/unit/sub-unit for implementation, or any one of the modules/units/sub-units may be divided into a plurality of modules/units/sub-units. Alternatively, at least part of the functions of one or more of these modules/units/sub-units may be combined with at least part of the functions of other modules/units/sub-units and implemented in one module/unit/sub-unit. According to embodiments of the present disclosure, at least one of the acquisition module 710, the first determination module 720 and the second determination module 730 may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable manner of integrating or encapsulating the circuit, or may be implemented by any one of the three implementation modes of software, hardware and firmware or an appropriate combination thereof. Alternatively, at least one of the acquisition module 710, the first determination module 720 and the second determination module 730 may be at least partially implemented as a computer program module that may perform corresponding functions when executed.

It should be noted that a part for the apparatus of processing the positioning information in embodiments of the present disclosure corresponds to a part for the method of processing the positioning information in embodiments of the present disclosure. For the descriptions of the apparatus of processing the positioning information, reference may be made to the method of processing the positioning information, and details will not be repeated here.

Figure 8:
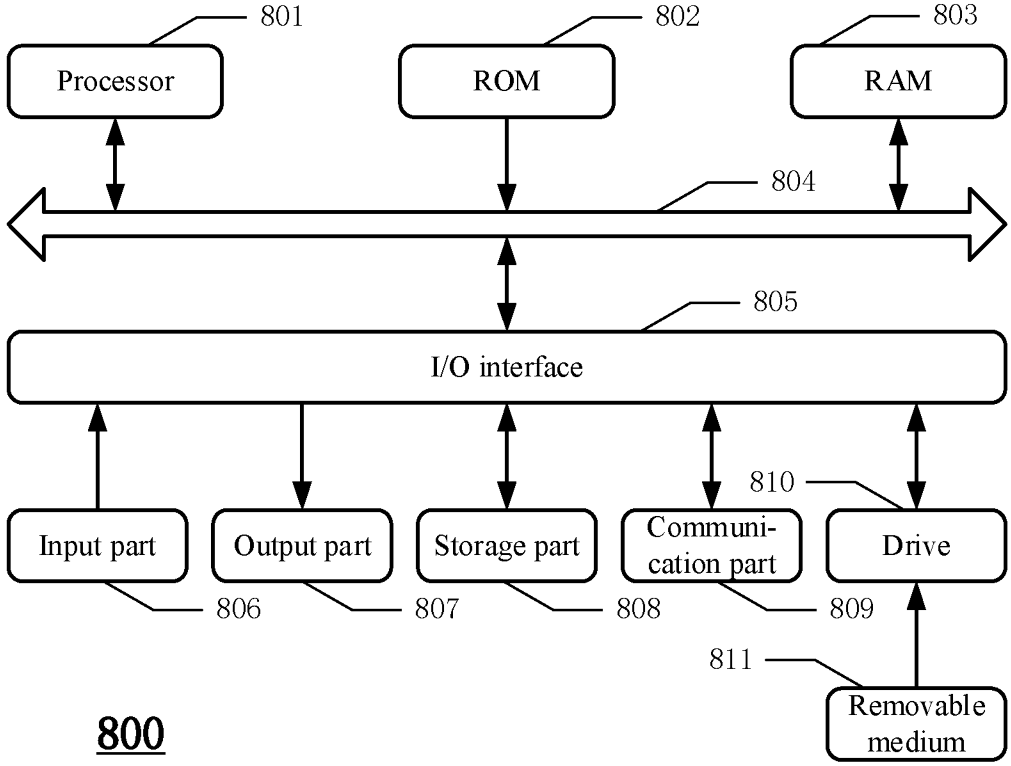
FIG. 8 schematically shows a block diagram of an electronic device suitable for implementing a method of processing a positioning information according to embodiments of the present disclosure.

FIG. 8 schematically shows a block diagram of an electronic device suitable for implementing the method of processing the positioning information according to embodiments of the present disclosure. The electronic device shown in FIG. 8 is just an example, and should not bring any limitation to functions and scopes of use of embodiments of the present disclosure.

As shown in FIG. 8, an electronic device 800 according to embodiments of the present disclosure includes a processor 801, which may execute various appropriate actions and processing according to the program stored in a read only memory (ROM) 802 or the program loaded into a random access memory (RAM) 803 from a storage part 808. The processor 801 may, for example, include a general-purpose microprocessor (for example, CPU), an instruction set processor and/or a related chipset and/or a special-purpose microprocessor (for example, an application specific integrated circuit (ASIC)), and the like. The processor 801 may further include an on-board memory for caching purposes. The processor 801 may include a single processing unit or plurality of processing units for executing different actions of the method flow according to embodiments of the present disclosure.

Various programs and data required for the operation of the device 800 are stored in the RAM 803. The processor 801, the ROM 802 and the RAM 803 are connected to each other through a bus 804. The processor 801 executes various operations of the method flow according to embodiments of the present disclosure by executing the programs in the ROM 802 and/or the RAM 803. It should be noted that the program may also be stored in one or more memories other than the ROM 802 and the RAM 803. The processor 801 may also execute various operations of the method flow according to embodiments of the present disclosure by executing the programs stored in the one or more memories.

According to embodiments of the present disclosure, the electronic device 800 may further include an input/output (I/O) interface 805 which is also connected to the bus 804. The electronic device 800 may further include one or more of the following components connected to the I/O interface 805: an input part 806 including a keyboard, a mouse, etc.; an output part 807 including a cathode ray tube (CRT), a liquid crystal display (LCD), etc. and a speaker, etc.; a storage part 808 including a hard disk, etc.; and a communication part 809 including a network interface card such as a LAN card, a modem, and the like. The communication part 809 performs communication processing via a network such as the Internet. A drive 810 is also connected to the I/O interface 805 as required. A removable medium 811, such as a magnetic disk, an optical disk, a magneto-optical disk, a semiconductor memory, and the like, is installed on the drive 810 as required, so that the computer program read therefrom is installed into the storage part 808 as needed.

The method flow according to embodiments of the present disclosure may be implemented as a computer software program. For example, embodiments of the present disclosure include a computer program product including a computer program carried on a computer-readable storage medium. The computer program includes a program code for execution of the method shown in the flowchart. In such embodiments, the computer program may be downloaded and installed from the network through the communication part 809, and/or installed from the removable medium 811. When the computer program is executed by the processor 801, the functions defined in the system of embodiments of the present disclosure are performed. According to embodiments of the present disclosure, the above-described systems, apparatuses, devices, modules, units, etc. may be implemented by computer program modules.

The present disclosure further provides a computer-readable storage medium, which may be included in the apparatus/device/system described in the embodiments; or exist alone without being assembled into the apparatus/device/system. The computer-readable storage medium carries one or more programs that when executed, perform the methods according to embodiments of the present disclosure.

According to embodiments of the present disclosure, the computer-readable storage medium may be a non-transitory computer-readable storage medium, for example, may include but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores programs that may be used by or in combination with an instruction execution system, apparatus or device.

For example, according to embodiments of the present disclosure, the computer-readable storage medium may include the above-mentioned ROM 802 and/or RAM 803 and/or one or more memories other than the ROM 802 and RAM 803.

Embodiments of the present disclosure further include a computer program product, which contains a computer program. The computer program contains program code for performing the method provided by embodiments of the present disclosure. When the computer program product runs on an electronic device, the program code causes the electronic device to implement the method of processing the positioning information provided in embodiments of the present disclosure.

When the computer program is executed by the processor 801, the functions defined in the system/apparatus of embodiments of the present disclosure are performed. According to embodiments of the present disclosure, the above-described systems, apparatuses, modules, units, etc. may be implemented by computer program modules.

In an embodiment, the computer program may rely on a tangible storage medium such as an optical storage device and a magnetic storage device. In another embodiment, the computer program may also be transmitted and distributed in the form of signals on a network medium, downloaded and installed through the communication part 809, and/or installed from the removable medium 811. The program code contained in the computer program may be transmitted by any suitable medium, including but not limited to a wireless one, a wired one, or any suitable combination of the above.

According to embodiments of the present disclosure, the program code for executing the computer programs provided by embodiments of the present disclosure may be written in any combination of one or more programming languages. In particular, these computing programs may be implemented using high-level procedures and/or object-oriented programming languages, and/or assembly/machine languages. Programming languages include, but are not limited to, Java, C++, Python, "C" language or similar programming languages. The program code may be completely executed on the user computing device, partially executed on the user device, partially executed on the remote computing device, or completely executed on the remote computing device or server. In a case of involving a remote computing device, the remote computing device may be connected to a user computing device through any kind of network, including a local area network (LAN) or a wide area networks (WAN), or may be connected to an external computing device (e.g., through the Internet using an Internet service provider).

The flowcharts and block diagrams in the accompanying drawings illustrate the possible architecture, functions, and operations of the system, method, and computer program product according to various embodiments of the present disclosure. In this regard, each block in the flowcharts or block diagrams may represent a part of a module, a program segment, or a code, which part includes one or more executable instructions for implementing the specified logical function. It should be further noted that, in some alternative implementations, the functions noted in the blocks may also occur in a different order from that noted in the accompanying drawings. For example, two blocks shown in succession may actually be executed substantially in parallel, or they may sometimes be executed in a reverse order, depending on the functions involved. It should be further noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions. Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

Embodiments of the present disclosure have been described above. However, these embodiments are for illustrative purposes only, and are not intended to limit the scope of the present disclosure. Although the various embodiments have been described separately above, this does not mean that measures in the respective embodiments may not be used in combination advantageously. The scope of the present disclosure is defined by the appended claims and their equivalents. Those skilled in the art may make various substitutions and modifications without departing from the scope of the present disclosure, and these substitutions and modifications should all fall within the scope of the present disclosure.

What is claimed is:

1. A method of processing a positioning information, comprising:

acquiring, in response to a positioning request, a distance information of each of a plurality of base stations for a terminal device;

determining, based on a plurality of distance information, a first position information of the terminal device in a first reference system determined based on the plurality of base stations; and determining a positioning information of the terminal device for a target object based on the first position information and a position information of the target object, wherein the position information of the target object is determined from a tomography result, wherein the plurality of base stations comprise a plurality of base station groups meeting a predetermined condition, and the predetermined condition indicates that a plurality of base stations in the base station group are not coplanar;

wherein the determining, based on a plurality of distance information, a first position information of the terminal device in a first reference system determined based on the plurality of base stations comprises:

determining, for each base station group, a second position information of the terminal device in the first reference system based on a plurality of distance information related to the base station group; and determining the first position information based on a plurality of second position information respectively related to the plurality of base station groups, wherein the plurality of base stations form a detection space comprising an internal space of a cuboid-shaped flight case, the plurality of base stations comprise eight UWB base stations fixed at vertices on an outer side of the flight case, the eight UWB base stations are divided into two base station groups, a first base station group comprises three UWB base stations on a first surface of the flight case and one UWB base station on a second surface of the flight case, a second base station group comprises one UWB base station on the first surface and three UWB base stations on the second surface, and the first surface and the second surface are opposite to each other.

2. The method according to claim 1, wherein the determining the first position information based on a plurality of second position information respectively related to the plurality of base station groups comprises:

acquiring a set of historical position information of the terminal device in the first reference system;

determining, based on the set of historical position information, a predicted position information of the terminal device at a request initiation moment of the positioning request; and determining the first position information based on the predicted position information and the plurality of second position information.

3. The method according to claim 2, wherein the determining, based on the set of historical position information, a predicted position information of the terminal device at a request initiation moment of the positioning request comprises:

generating a displacement curve of the terminal device based on the set of historical position information; and predicting a position of the terminal device at the request initiation moment based on the displacement curve, so as to obtain the predicted position information.

4. The method according to claim 3, wherein the set of historical position information comprises a plurality of historical position information, and the historical position information is configured with a recording moment;

wherein the generating a displacement curve of the terminal device based on the set of historical position information comprises:

extracting, from the set of historical position information, a plurality of first target historical position information with recording moments closest to the request initiation moment;

performing an interpolation on the plurality of first target historical position information by using a Catmull-Rom interpolation algorithm, so as to obtain a plurality of interpolation point position information; and generating the displacement curve of the terminal device based on the plurality of first target historical position information and the plurality of interpolation point position information.

5. The method according to claim 4, wherein the predicting a position of the terminal device at the request initiation moment based on the displacement curve so as to obtain the predicted position information comprises:

determining a second target historical position information from the plurality of first target historical position information, wherein a recording moment of the second target historical position information is closest to the request initiation moment;

determining, based on the displacement curve, a predicted velocity information associated with the second target historical position information;

determining a predicted displacement information according to the predicted velocity information, the request initiation moment and the recording moment of the second target historical position information; and determining the predicted position information based on the predicted displacement information and the second target historical position information.

6. The method according to claim 2, wherein the determining the first position information based on the predicted position information and the plurality of second position information comprises:

calculating, for each second position information, a distance between a coordinate indicated by the predicted position information and a coordinate indicated by the second position information, so as to obtain a distance value;

determining a target distance value from a plurality of distance values respectively related to the plurality of second position information, wherein the target distance value is a minimum value in the plurality of distance values; and determining the second position information related to the target distance value as the first position information.

7. The method according to claim 1, wherein the determining the first position information based on a plurality of second position information respectively related to the plurality of base station groups comprises:

determining information weights respectively related to the plurality of second position information based on signal attenuation amounts of the plurality of base station groups; and determining the first position information based on the plurality of second position information and the information weights respectively related to the plurality of second position information.

8. The method according to claim 1, wherein the determining the first position information based on a plurality of second position information respectively related to the plurality of base station groups comprises:

calculating an average value of coordinates indicated by the plurality of second position information, so as to obtain the first position information.

9. The method according to claim 1, wherein the determining a positioning information of the terminal device for a target object based on the first position information and a position information of the target object comprises:

determining a second reference system based on the tomography result;

processing the position information of the target object by using a conversion strategy between the first reference system and the second reference system, so as to obtain a third position information of the target object in the first reference system; and generating the positioning information based on the first position information and the third position information.

10. The method according to claim 1, further comprising:

sending the positioning information to the terminal device, so as to display the positioning information on the terminal device.

11. The method according to claim 1, further comprising:

scanning a detection space formed by the plurality of base stations by using an electronic computer tomography scanner, so as to obtain the tomography result.

12. An electronic device, comprising:

one or more processors; and a memory configured to store one or more instructions, wherein the one or more instructions are configured to, when executed by the one or more processors, cause the one or more processors to implement the method of claim 1.

13. A non-transitory computer readable storage medium having executable instructions therein, wherein the executable instructions are configured to, when executed by a processor, cause the processor to implement the method of claim 1.

14. A method of processing a positioning information, comprising:

acquiring, in response to a positioning request, a distance information of each of a plurality of base stations for a terminal device;

determining, based on a plurality of distance information, a first position information of the terminal device in a first reference system determined based on the plurality of base stations; and determining a positioning information of the terminal device for a target object based on the first position information and a position information of the target object, wherein the position information of the target object is determined from a tomography result, wherein the determining a positioning information of the terminal device for a target object based on the first position information and a position information of the target object comprises:

determining a second reference system based on the tomography result;

processing the position information of the target object by using a conversion strategy between the first reference system and the second reference system, so as to obtain a third position information of the target object in the first reference system; and generating the positioning information based on the first position information and the third position information.

* * * * *